United States Patent [19]

Sato et al.

[11] Patent Number: 4,745,171
[45] Date of Patent: May 17, 1988

[54] POLY-ε-CAPROLACTONE RESIN AND METHOD FOR RETARDING HYDROLYSIS RATE THEREOF

[75] Inventors: Takashi Sato; Kisaku Otani, both of Ohtake, Japan

[73] Assignee: Daicel Chemical Industries, Ltd., Osaka, Japan

[21] Appl. No.: 34,717

[22] Filed: Apr. 6, 1987

[30] Foreign Application Priority Data

Apr. 15, 1986 [JP] Japan .................................. 61-85024

[51] Int. Cl.$^4$ .............................................. C08G 63/08
[52] U.S. Cl. ...................................... 528/116; 528/354
[58] Field of Search ................................. 528/116, 354

[56] References Cited

U.S. PATENT DOCUMENTS 3,203,920  8/1965  Nikles et al. .................... 528/116 X
3,294,743 12/1966  Mack ................................... 528/116
4,086,294  4/1978  Koleske et al. ................. 528/354 X Primary Examiner—Earl Nielsen
Attorney, Agent, or Firm—McAulay, Fields, Fisher, Goldstein & Nissen

[57] ABSTRACT

A poly-ε-caprolactone resin having an enhanced stability to hydrolysis is obtained by ring-opening polymerization of ε-caprolactone with 0.01 to 5.0% by weight, based on the ε-caprolactone, of an epichlorohydrin-bisphenol A type epoxy compound of the formula:

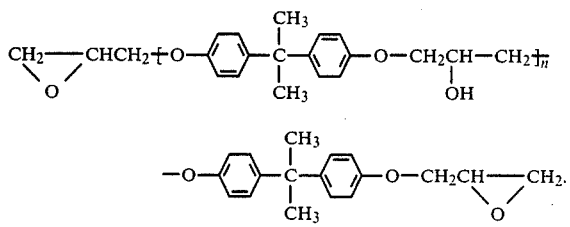

11 Claims, 1 Drawing Sheet

POLY-ε-CAPROLACTONE RESIN AND METHOD FOR RETARDING HYDROLYSIS RATE THEREOF

BACKGROUND OF THE INVENTION

1. Field of the Invention

The present inventions relate to a novel poly-ε-caprolactone resin having an excellent hydrolysis stability and a method for retarding the hydrolysis rate of poly-ε-caprolactone.

2. Description of the Related Art

A poly-ε-caprolactone resin has been widely used in a variety of fields because of advantages of high crystallinity, high hardness in the room temperature and relatively low melting point (i.e., 50° to 60° C.) of crystal parts. For example, this resin is used as a toggle operating body (Japanese unexamined patent publication No. 60-240,492) and a plastic material (Japanese unexamined patent publication No. 61-42,679). Furthermore, the resin is widely used as an optimum material in the field where a model of a part of the human body is prepared and the model is fitted to the human body, such as for a medical gypsum material (Japanese unexamined patent publication No. 58-81,042), a splint material, a face mask for shielding from radiation, or a modelling material for a periwig (Japanese Unexamined Patent Application No. 59-70,021).

A poly-ε-caprolactone resin having a number average molecular weight of 10,000 to 200,000 is generally used in the above-mentioned fields, and this resin is prepared by subjecting ε-caprolactone to ring-opening polymerization in the presence of an appropriate catalyst and an initiator having an active hydrogen atom.

However, the poly-ε-caprolactone resin prepared according to this process has a problem in that, when the resin is stored for a long time, the molecular weight is reduced by hydrolysis and the mechanical strengths are abruptly lost. This problem is commonly observed in polyester resins having an ester linkage, and is especially conspicuous in the poly-ε-caprolactone resin.

When an ε-caprolactone monomer is polymerized, a trace amount of water contained in the monomer acts as an initiator for ring-opening polymerization. The obtained poly-ε-caprolactone resin has the following structure:

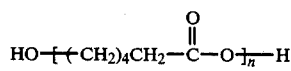

wherein n is an integer of 85 to 1,800 on the average. Namely, the residual carboxyl group is inevitably present at the terminal of the molecular chain. If water in the ε-caprolactone monomer is completely removed to 0% and an initiator such as ethylene glycol is used, a carboxyl group will not be formed at the terminal of the molecule. However, it is practically impossible to remove water completely to 0%.

By the carboxyl group present at the terminal of the molecule, the hydrolysis common to linear polyesters is further promoted catalytically, and the polymerization degree is reduced with the lapse of polymerization time.

Accordingly, when a pellet or flake of the resin is stored or in the market or an end article such as a medical gypsum material, splint material, a face mask or a modelling material for a periwig is stored or in the market in the form of a plate or rod, the degree of polymerization of the resin is reduced, and sometimes the deterioration by hydrolysis is advanced to such an extent that the resin cannot be put into practical use. Especially in summer, the deterioration by hydrolysis is more conspicuously promoted than in the other seasons.

For preventing the above-mentioned deterioration, various attempts have been made. For example, delicate maintenance control such as for low-temperature storage has ordinarily been carried out.

Furthermore, there has been adopted a process in which a carbodiimide represented by the general formula:

wherein R and R' may be the same or different, and are hydrocarbon groups having 1 to 24 carbon atoms (e.g., cyclohexyl and isopropyl), or an epoxy resin is added as a stabilizer against the hydrolysis in a small amount to a poly-ε-caprolactone resin to control the hydrolysis (Japanese unexamined patent publication No. 61-241,354 filed by the same assignee). The carbodiimide includes, for example, N,N'- bis(2,6-diisopropylcyclohexyl)carbodiimide and N,N'-dicyclohexyl-carbodiimide.

However, the carbodiimide has a relatively high skin-irritating property and use of the resin composition as a medical gypsum material, a radiation-shielding face mask or a medical splint material, which is in direct contact with the skin, is limited.

Furthermore, since the carbodiimide has a high reactivity with water or other polymerization initiators and discoloration by exposure to heat is conspicuous, the carbodiimide cannot be added during the step of polymerization of the monomer.

Accordingly, the carbodiimide is post-blended with the resin and, therefore, blending equipment becomes necessary. Moreover, deterioration is caused by heating and mechanical mixing for the post blending of the carbodiimide.

SUMMARY OF THE INVENTION

Under the above-mentioned background, it is a primary object of the present invention to provide a poly-ε-caprolactone resin which is prepared economically and advantageously and has an excellent resistance against hydrolysis.

Another object of the present invention is to provide a method for retarding the hydrolysis rate of a poly-ε-caprolactone resin.

More specifically, in one aspect of the present invention, there is provided a poly-ε-caprolactone resin obtained by ring-opening polymerization of a composition comprising ε-caprolactone and 0.01 to 5.0% by weight, based on the ε-caprolactone, of an epichlorohydrin-bisphenol A type epoxy compound represented by the following formula (1):

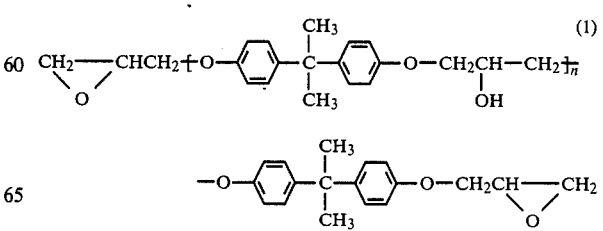

wherein n is a number of from 0 to 5.

In another aspect of the present invention, there is provided a method for retarding the hydrolysis rate of a poly-ε-caprolactone resin, which comprises ring-opening polymerization of ε-caprolactone together with 0.01 to 5.0% by weight, based on the ε-caprolactone, of the epichlorohydrine-bisphenol A type epoxy compound of the formula (1).

DESCRIPTION OF THE PREFERRED EMBODIMENTS

Figure 1:
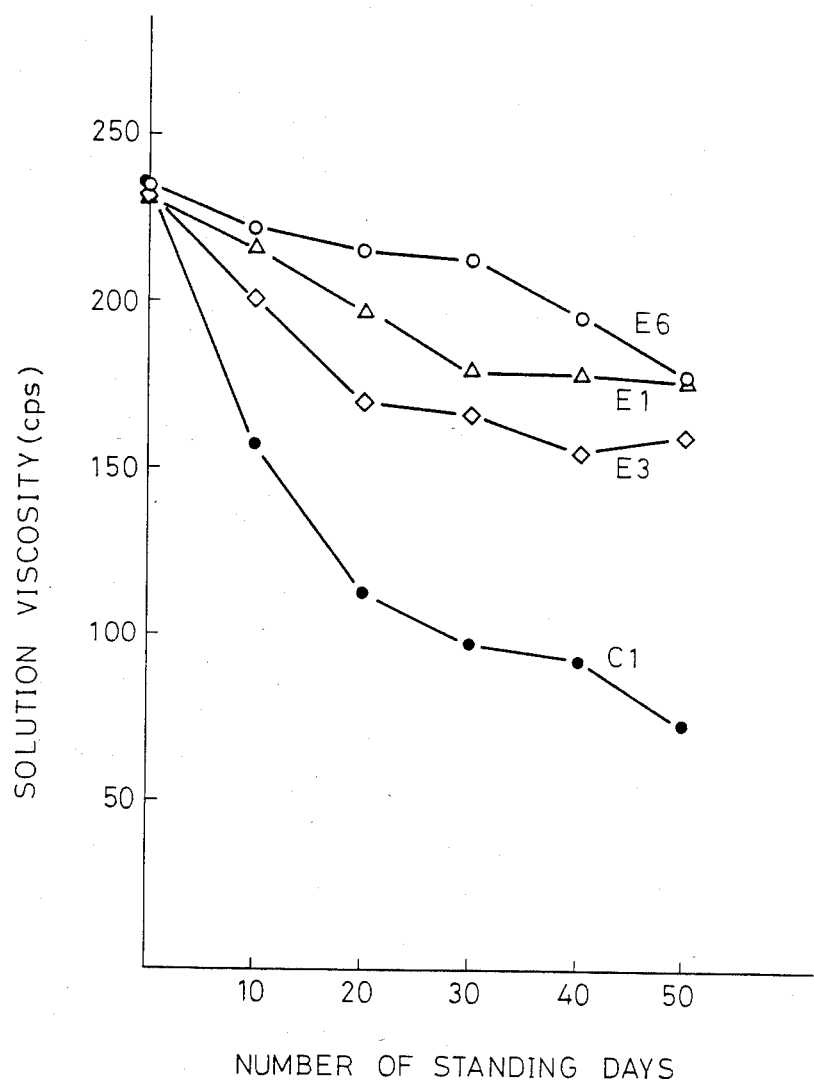
FIG. 1 is a graph illustrating the results obtained in Examples 1 through 3 and Comparative Example 1, in which the relationship of the solution viscosity (cp) of poly-ε-caprolactone resins measured at a 10% concentration by an E type viscometer with the number of standing days is shown.

A poly-ε-caprolactone resin is generally prepared by ring-opening polymerization of an ε-caprolactone monomer effected at a temperature of 120° to 220° C. in the presence of an initiator and a catalyst.

Any compounds having an active hydrogen atom can be used as the initiator. As preferred examples of the initiator, there can be mentioned water, ethylene glycol, propylene glycol, 1,4-butanediol, 1,3-butylene glycol, diethylene glycol, neopentyl glycol, 1,6-hexanediol, and 1,4-cyclohexane-dimethanol. The molecular weight of the poly-ε-caprolactone resin is controlled by adjusting the amount of the initiator added.

In order to obtain a poly-ε-caprolactone resin having a molecular weight as high as a number average molecular weight of 50,000 to 200,000, there is preferably adopted a process in which a very minor amount (e.g., less than 0.1% by weight) of water present in the monomer is utilized as the initiator and the ring-opening polymerization is carried out at 120° to 220° C. in the presence of a catalyst.

The epichlorohydrin-bisphenol A type epoxy compounds used in the present invention has a chemical structure represented by the following general formula (1):

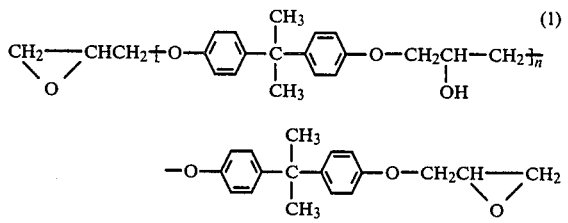

wherein n is a number of from 0 to 5.

The epoxy compounds include, for example, compound in which n is about 0, such as Epikote 828 and Araldite GY-260, compounds in which n is about 1, such as Epikote 834 and Araldite GY-280, compounds in which n is about 2, such as Epikote 1001 and Araldite 6071, compounds in which n is about 3, such as Epikote 1002 and Araldite 7072, and compounds in which n is about 4, such as Epikote 1004 and Araldite 6084 (Note, "Epikote" and "Araldite" are trademarks possessed by Shell Chemicals Corp. and Ciba-Geigy A.G., respectively: n represents the average of polymerization and, therefore, such an expression as "n is about 0" is adopted).

Among these epoxy compounds, diglycidyl ether bisphenol A in which n is 0 is especially effective for preventing the hydrolysis of the poly-ε-caprolactone resin. This is because the compound in which n is 0 is a liquid, and it is easy to mix the epoxy compound with the ε-caprolactone monomer, and thus the operation is facilitated.

An alicyclic epoxy compound can be mentioned as the epoxy compound in addition to the above-mentioned epichlorohydrin-bisphenol A type epoxy compound.

However, where an alicyclic epoxy compound such as 3,4-epoxycyclohexylmethyl 3,4-epoxycyclohexane-carboxylate is used as the epoxy compound, water in the ε-caprolactone monomer is consumed by reaction with the epoxy groups before the temperature reaches the polymerization temperature and thus, a product having an extraordinarily high molecular weight (gelled product) is inevitably formed.

Initiators other than water also react with the epoxy groups under severe conditions for formation of poly-ε-caprolactone such as a polymerization temperature of 150° to 200° C.

In the present invention, the amount of the epichlorohydrin-bisphenol A type epoxy compound added is 0.01 to 5% by weight, preferably 0.1 to 1% by weight, based on the weight of the ε-caprolactone monomer.

If the amount of the epoxy compound added is too small, blocking of the carboxyl group present at the terminal of the molecule of the poly-ε-caprolactone resin is insufficient and the effect of preventing the hydrolysis is low. On the other hand, if the amount of the epoxy compound added is too large, the plasticizing effect is generated when n is 0 or 1 in the general formula (1) representing the epichlorohydrin-bisphenol A type epoxy compound, and the resin becomes softer than the intended hard resin, with the result that deformation or other problems occur during transportation of storage. When n is 2, 3 or 4, if the amount of the epoxy compound added is too large, since the epoxy compound is a solid having a melting point higher than 65° C. and is harder than the poly-ε-caprolactone resin, a resin having an intended softness cannot be obtained.

In the production of the polymer, a terminal carboxyl group-COOH is formed because of the presence of water in the monomer. Accordingly, preferably, the ε-caprolactone monomer is dehydrated in advance, because the number of such terminal carboxyl groups can thus be reduced and the amount of the epichlorohydrin-bisphenol A type epoxy compound necessary for blocking the terminal carboxyl groups also can be reduced.

Specifically, it is preferred that the water content in the ε-caprolactone monomer be not higher than 0.1% by weight, especially not higher than 0.02% by weight. The water content in a commercially available ε-caprolactone monomer is about 0.03% by weight. Accordingly, preferably this monomer is dehydrated to a water content not higher than 0.025% by weight by a customary dehydration method such as a method in which the monomer is heated under a reduced pressure or a dehydration method using a molecular sieve, and the molecular weight of the resulting resin is adjusted, if necessary, by using an alcohol as mentioned above as the initiator other than water.

If the water content exceeds 0.1% by weight, the molecular weight of the obtained poly-ε-caprolactone resin is less than 10,000, which is a lowest level necessary for imparting the mechanical properties required for plastics, and, thus, the obtained polymer is brittle and has reduced strengths.

The addition of the epichlorohydrin-bisphenol A type epoxy compound to the ε-caprolactone monomer may be accomplished by a method in which the epoxy compound is incorporated into the monomer in advance or a method in which the epoxy compound is incorporated into the monomer in advance or a method in which the epoxy compound is added immediately before or immediately after initiation of the polymerization while the polymerization degree is not elevated to a significant extent.

If the epoxy compound is added in the state where the polymerization degree is elevated to a significant extent, a sufficient homogeneous mixing is difficult. Furthermore, a solid epoxy compound in which n is 2, 3 or 4 may be added to the monomer in the form of a flake or in the liquid state after dissolution.

The polymerization temperature is 120° to 220° C., preferably 150° to 200° C. with the polymerization temperature lower than 120° C., the reaction rate suitable for industrial-scale operation cannot be obtained, with the polymerization temperature exceeding 220° C., depolymerization is caused and the molecular weight is not increased.

Preferably the polymerization reaction is carried out in an atmosphere of nitrogen gas, because discoloration of the polymer can be thus prevented.

As the catalyst used for the polymerization, there can be mentioned organic titanium compounds such as tetramethoxytitanium, tetraethoxytitanium, tetra-n-propoxytitanium, tetraisopropoxytitanium, and tetrabutoxytitanium; organic tin compounds such as di-n-butyltin dilaurate, di-isobutyltin oxide, and dibutyltin diacetate; a salt of acetic acid with magnesium, calcium or zinc; antimony oxide; a stannous halide such as stannous chloride; and perchloric acid. The hydrolysis-retarding activity of the epichlorohydrin-bisphenol A type epoxy compound is not particularly hindered by any of the catalysts. Preferably the catalyst is used in an amount of 10 to 10,000 ppm based on the ε-caprolactone monomer.

The poly-ε-caprolactone resin produced by ring-opening polymerization of ε-caprolactone with the epichlorohydrin-bisphenol A type epoxy compound has excellent stability to hydrolysis. Since the epoxy compound is added to the monomer, equipment and process for post addition of the additive can be omitted and, therefore, the resin can be prepared economically advantageously.

In preparing the poly-ε-caprolactone resin of the present invention, an antioxidant, an ultraviolet absorber and other auxiliaries may be added appropriately in addition to the epichlorohydrin-bisphenol A type epoxy compound.

The present invention will now be described in detail with reference to the following examples that by no means limit the scope of the invention.

Note, all "parts" in the examples are by weight.

EXAMPLE 1

A separable flask was charge with 10,000 parts of ε-caprolactone having a water content of 0.025% by weight, and 1.0 part of stannous chloride as the catalyst and 20 parts of Epikote 828 (supplied by Shell Chemical Corp. and having n of about 0) as the stabilizer against the hydrolysis were added. The temperature of the mixed solution was elevated from 80° C. to 150° C. while bubbling with nitrogen gas. After the temperature elevation, air was bubbled at a rate of 50 ml/min for 10 minutes, and $N_2$ gas then bubbled again.

Subsequently, the temperature of the mixed solution was elevated to 180° C. to initiate reaction, and it was observed that the solution became viscous. Then, aging was conducted for about 2 hours, and the content was taken out and pelletized.

Then, 10 parts of the pelletized resin was dissolved in 90 parts of xylene and the viscosity of the solution was measured at 25° C. by an E type viscometer. It was found that the solution viscosity was 223 cps at 25° C.

The so-obtained poly-ε-caprolactone resin (100 parts) was allowed to stand in an atmosphere maintained at a temperature of 50° C. and a relative humidity of 80%, 10 parts of the resin were taken out at an interval of 10 days during a period of 50 days and dissolved in 90 parts of xylene, and the viscosity of the solution was measured at 25° C. by an E type viscometer. The reduction of the viscosity was gradual, as shown in FIG. 1 (curve E1).

In FIG. 1, the viscosity (cps/at 25° C.) of the solution is plotted on the ordinate and the standing time (days) is plotted on the abscissa.

COMPARATIVE EXAMPLE 1

The procedures of Example 1 were repeated in the same manner except that Epikote 828 was not used.

The solution viscosity was 235 cps at 25° C. The number average molecular weight of the polymer determined by gel permeation chromatography was 120,000. The viscosity reduction with the lapse of time was observed in the same manner as in Example 1. The results are shown in Table in and FIG. 1 (curve C1).

EXAMPLE 2

The procedures of Example were repeated in the same manner except that the amount of Epikote 828 added was changed to 200 parts.

The solution viscosity was 213 cps at 25° C. The viscosity reduction with the lapse of time was observed. The results are shown in Table 1.

EXAMPLE 3

The procedures of Example 1 were repeated in the same manner except that the amount of Epikote 828 added was changed to 5 parts.

The solution viscosity was 213 cps at 25° C. The viscosity reduction with the lapse of time was observed. The results are shown in Table 1 and FIG. 1 (curve E3).

EXAMPLE 4

The procedures of Example 1 were repeated in the same manner except that 20 parts of Epikote 834 (supplied by Shell Chemicals Corp. and having n of about 1.0) was used instead of 20 parts of Epikote 828.

The viscosity reduction with the lapse of time was observed in the same manner as in Example 1. The results are shown in Table 1.

EXAMPLE 5

The procedures of Example 1 were repeated in the same manner except that 20 parts of Epikote 1002 (supplied by Shell Chemicals Corp. and having n of about 3) was used instead of 20 parts of Epikote 828.

The viscosity reduction with the lapse time was observed in the same manner as in Example 1. The results are shown in Table 1.

EXAMPLE 6

The procedures of Example 1 were repeated in the same manner except that 20 parts of Epikote 1004 (supplied by Shell Chemicals Corp. and having n of about 4) was used instead of 20 part of Epikote 828.

The viscosity reduction with the lapse of time was observed in the same manner as in Example 1. The results are shown in Table 1 and FIG. 1 (curve E6).

TABLE 1

| | Solution viscosity (cps at 25° C.) | | | | | | |
|---|---|---|---|---|---|---|---|
| | Immediately after polymerization | After 10 days | After 20 days | After 30 days | After 40 days | After 50 days | Retention ratio (%) |
| Example 1 | 223 | 213 | 197 | 180 | 180 | 178 | 79.8 |
| Comparative Example 1 | 235 | 157 | 111 | 97 | 92 | 73 | 31.1 |
| Example 2 | 213 | 193 | 187 | 175 | 174 | 172 | 80.8 |
| Example 3 | 231 | 201 | 170 | 167 | 155 | 161 | 80.1 |
| Example 4 | 232 | 215 | 208 | 193 | 188 | 185 | 79.7 |
| Example 5 | 220 | 212 | 193 | 188 | 185 | 170 | 77.3 |
| Example 6 | 234 | 221 | 215 | 213 | 196 | 178 | 76.1 |

$$\text{Retention ratio (\%)} = \frac{\text{solution viscosity after 50 days at 50° C. and 80\% RH}}{\text{solution viscosity immediately after polymerization}} \times 100$$

We claim:

1. A poly-ε-caprolactone resin obtained by ring-opening polymerization of a monomer composition comprising ε-caprolactone and 0.01 to 5.0% by weight, based on the ε-caprolactone, of an epichlorohydrin-bisphenol A type epoxy compound represented by the following general formula (1):

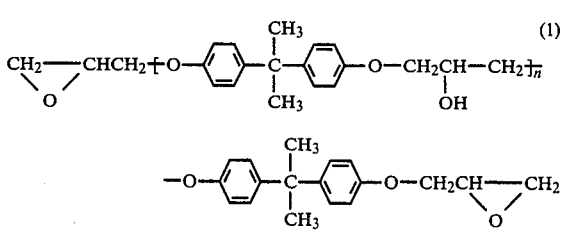

wherein n is an average degree of polymerization and a number of 0 to 5.

2. A poly-ε-caprolactone resin according to claim 1 wherein the amount of the epoxy compound is 0.1 to 1% by weight based on the ε-caprolactone.

3. A poly-ε-caprolactone resin according to claim 1 wherein the monomer composition contains smaller than 0.1% by weight, based on the ε-caprolactone, or water.

4. A poly-ε-caprolactone resin according to claim 1 wherein the monomer composition comprises not larger than 0.02% by weight, based on the ε-caprolactone, of water.

5. A poly-ε-caprolactone resin according to claim 1 wherein the monomer composition contains 10 to 10,000 ppm, based on the ε-caprolactone, of a catalyst.

6. A poly-ε-caprolactone resin according to claim 5 wherein the catalyst is stannous chloride.

7. A method for retarding the hydrolysis rate of a poly-ε-caprolactone resin, which comprises ring-opening polymerization of ε-caprolactone together with 0.01 to 5.0% by weight, based on the ε-caprolactone, of an epichlorohydrin-bisphenol A type of epoxy compound represented by the following general formula (1):

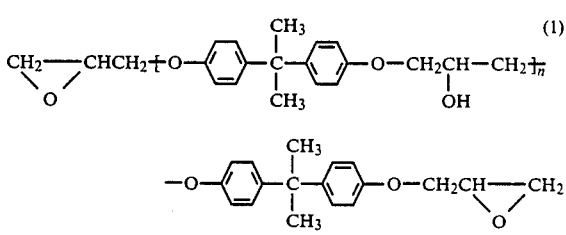

wherein n is an average degree of polymerization and an number of 0 to 5.

8. A method according to claim 7 wherein the amount of the epoxy compound is 0.1 to 1% by weight based on the ε-caprolactone.

9. A poly-ε-caprolactone resin according to claim 7 wherein the monomer composition contains smaller than 0.1% by weight, based on the ε-caprolactone, of water.

10. A poly-ε-caprolactone resin according to claim 7 wherein the monomer composition comprises not larger than 0.02% by weight, based on the ε-caprolactone, of water.

11. A poly-ε-caprolactone resin according to claim 7 wherein the monomer composition contains 10 to 10,000 ppm, based on the ε-caprolactone, of a catalyst.

* * * * *